Oct. 8, 1968 B. B. CHAPMAN 3,404,859
LEVELLING AND SUPPORTING APPARATUS
Filed Dec. 16, 1966 3 Sheets-Sheet 1
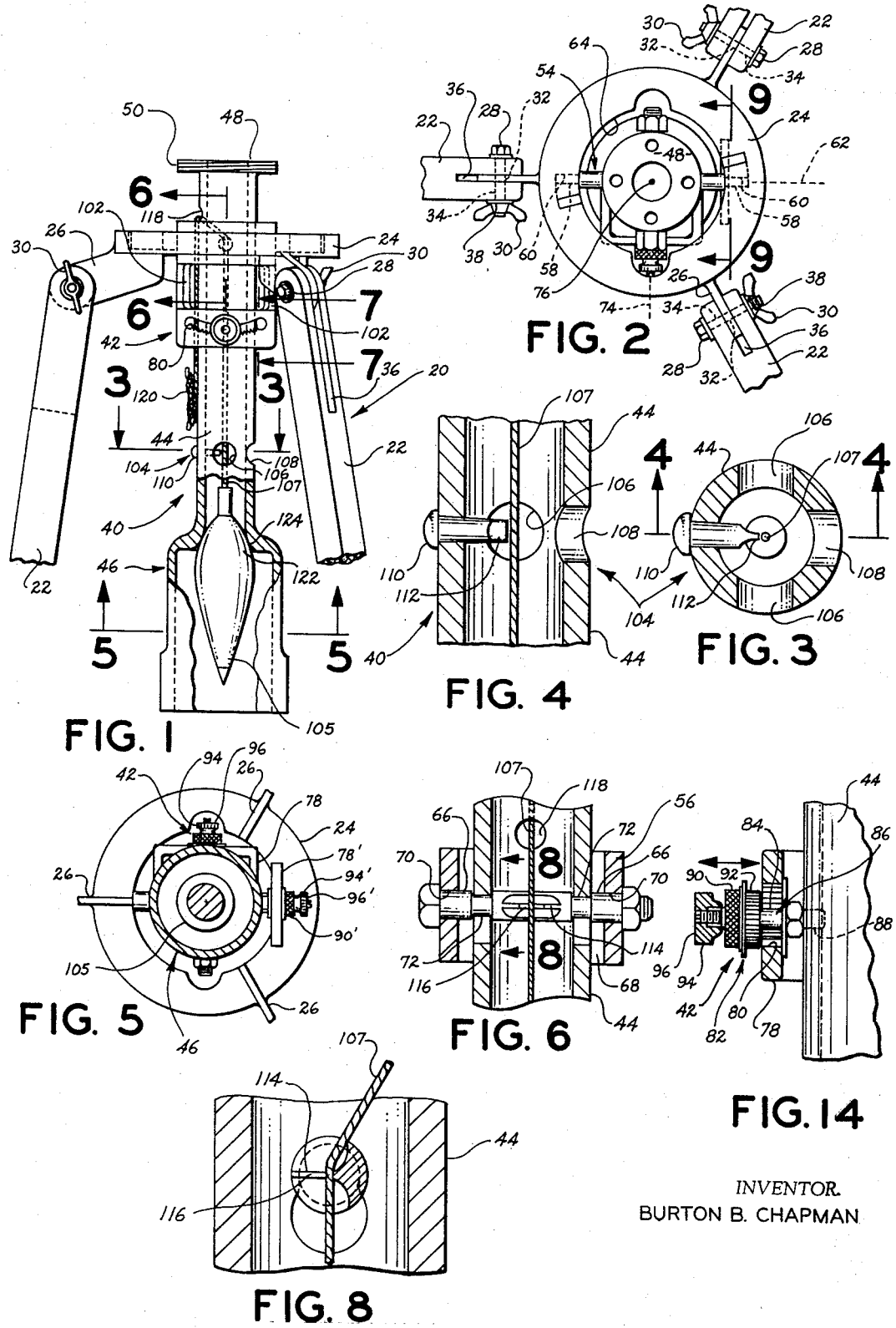
INVENTOR.
BURTON B. CHAPMAN Oct. 8, 1968    B. B. CHAPMAN    3,404,859
LEVELLING AND SUPPORTING APPARATUS
Filed Dec. 16, 1966    3 Sheets-Sheet 2

INVENTOR.
BURTON B. CHAPMAN

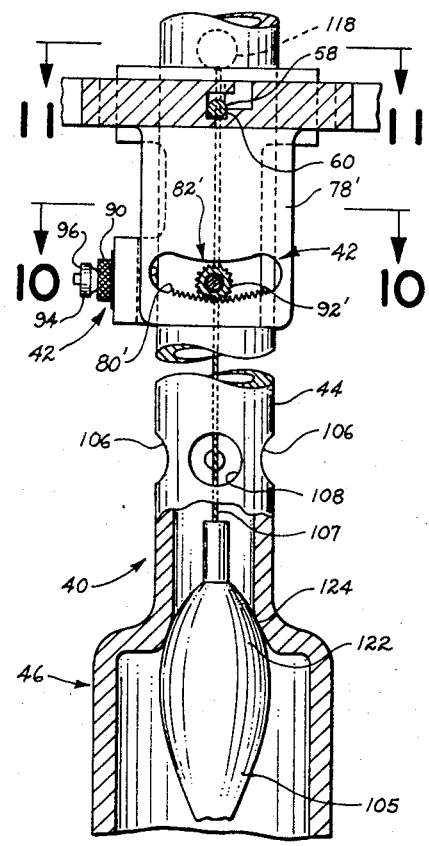
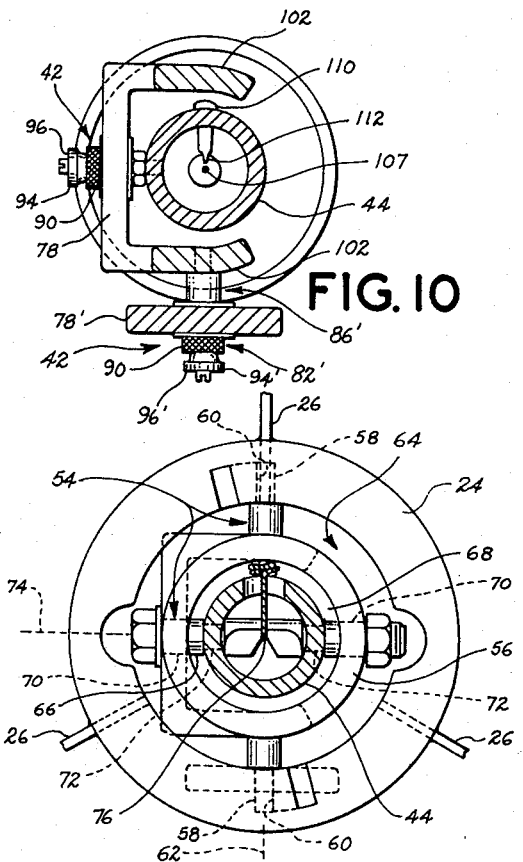
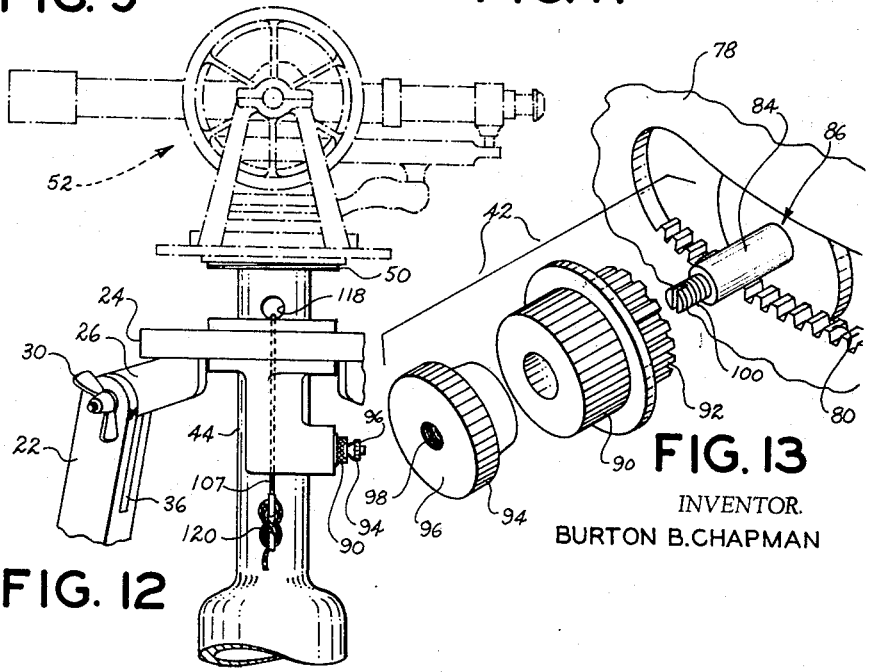

United States Patent Office 3,404,859
Patented Oct. 8, 1968

3,404,859
LEVELLING AND SUPPORTING APPARATUS
Burton B. Chapman, 1612 W. Shorb St.,
Alhambra, Calif. 91803
Filed Dec. 16, 1966, Ser. No. 602,301
13 Claims. (Cl. 248—184)

ABSTRACT OF THE DISCLOSURE

A leveling means of the type used to support transits on tripod stands. The levelling means utilizing a gimbal-type support provided with adjusting means to move the transit to a level position and locking means to secure it in the desired position. A plumb bob type level indicator is mounted within a vertical sleeve member to indicate when the support is in a level position.

---

Generally speaking, the present invention relates to levelling and supporting apparatus adapted to support an auxiliary object in a selected orientation with respect to a true level or horizontal plane, which may be said to comprise a reference orientation. In many cases, the selected orientation will be co-planar with said level true horizontal plane or reference orientation although, in certain cases, the auxiliary object may be intended to be positioned in a selected orientation different from said level or true horizontal plane or reference orientation and may be angularly displaced therefrom. However, the apparatus of the present invention, for purposes of simplicity and clarity and for facilitating understanding thereof, will be described primarily in connection with those forms of the apparatus wherein the selected orientation is substantially co-planar with the true level or horizontal plane comprising the above-mentioned reference orientation. It should be clearly understood throughout the description which follows hereinafter that the present invention is to be construed broadly and is intended to include and comprehend such apparatuses and equipments where the selected orientation is other than, but is in a predetermined or measurable relationship with respect to, such a reference plane.

It should be noted that the novel levelling and supporting apparatus of the present invention is not only intended to support an auxiliary object in a selected orientation with respect to a reference plane (usually coincident or co-planar therewith, as referred to above), but is also adapted to facilitate the initial positioning adjustment of the auxiliary object around two mutually-perpendicular and usually substantially-horizontal axes so as to quickly and easily and virtually automatically, under the action of gravity, move into a position such that the supported object virtually lies in said selected orientation when it is substantially co-planar or coincident with respect to such a reference plane which is a substantially level or true horizontal plane. In other words, a simpler way of specifying the same thing might be to state that the apparatus is of a substantially self-levelling type requiring a virtual minimum of any subsequent correctional adjustments in order to achieve the selected orientation relative to the horizontal reference plane.

Additionally, it should be noted that the apparatus of the present invention is provided with controllably operable, small-magnitude orientation-correction means and locking means for effectively making very small-magnitude or minor-extent orientation corrections of the apparatus, and of an auxiliary object carried thereby, after completion of the self-levelling operation referred to above in order to provide whatever necessary very small correction is required for the purpose of achieving a substantially exact positioning of the auxiliary object and the portions of the levelling and supporting apparatus connected thereto in said selected orientation where it comprises such a horizontal reference plane.

In other words, it may be found that after the self-levelling function of the invention has achieved a substantially correct positioning of the auxiliary object in a selected orientation coincident or co-planar wth said substantially true horizontal reference plane (or in any predetermined angular relationship with respect thereto) that a very small angular positional error still exists. This may be for a variety of reasons, such as non-symmetrical distribution of weight relative to the center of the two mutually-perpendicular axes of rotation, frictional hysteresis preventing complete rotation of the rotating portions of the levelling and supporting apparatus around either one or both of the axes of rotation thereof to the optimum gravity-induced position thereof, or for various other reasons, or it may be found that the levelling and supporting apparatus itself may provide certain small-magnitude constraints of a non-symmetrical character operable to prevent the attainment, under the action of gravity, of a position co-planar or coincident with a substantially true horizontal plane (or of a true vertical plane by a depending portion of the apparatus). Therefore, the above-mentioned controllably-operable small-magnitude orientation-correction means and locking means may be manually operated to bring about the desired corrective angular repositioning into the selected orientation where the depending portion of the levelling apparatus and the center-of-gravity line thereof is vertically directed and vertically centered with respect to a portion of the apparatus adapted to carry said auxiliary object (usually thereabove). Upon completion of the small-magnitude orientation-correction operation just referred to above, the apparatus operates to effectively lock the relatively rotatable parts in immovable relationship to each other until subsequently again effectively released and/or operated.

It should be understood that normally the above-mentioned controllably-operable small-magnitude orientation correction means and locking means may be moved into an effectively inoperative or effectively inactivated position to allow the self-levelling operation of the apparatus referred to hereinbefore to function freely initially after a supporting structure portion of the apparatus is initially set up on an underlying ground surface, or the like. As soon as the self-levelling function has been completed, then normally the controllably operable small-magnitude orientation-correction means and locking means is then effectively placed in operable or activated relationship with respect to the relatively-movable parts of the apparatus for the small-magnitude orientation-correction purposes and subsequent locking purposes briefly described above.

In one exemplary but non-specifically-limiting form of the apparatus, it may be intended to support an auxiliary object which may comprise a surveyor's transit, a theodolite, an inexpensive surveying instrument comprising a telescope (in certain cases, provided with reticle means, cross-hair means, or other optical sighting means) which may have two mutually-perpendicular level-indicating bubble-instrument means, a camera, or many other different types of auxiliary objects where the precise positioning thereof in a selected orientation and/or the measuring of any deviation therefrom is of importance.

It will be understood that the novel apparatus of the present invention, when supporting a surveying instrument as referred to above, is very superior in function to the conventional supporting apparatus for such a surveyor's instrument where positional adjustment of the transit or other surveying instrument is usually achieved by adjusting four different position-adjusting screws at the base thereof, and this lengthy, time-consuming, and multi-step operation is not even begun until the supporting structure (usually a tripod having three length-adjustable legs, or the like) has been initially positioned so as to have an upper connection apex panel or platform portion thereof positioned in as nearly a horizontal plane as can be achieved by adjusting the lengths and positions of such a tripod-type supporting structure. This monotonous and time-consuming operation is largely eliminated through the use of the apparatus of the present invention since the previously-described self-levelling operation of the present invention achieves most of the necessary levelling, leaving only a very small correctional adjustment to be made by the above-mentioned small-magnitude orientation-correction means and locking means of the present invention, which can be very quickly completed.

Incidentally, it should be noted that, in one preferred form of the present invention, orientation-indicating means may be provided in a manner cooperable with the self-levelling means of the present invention for visually indicating the true orientation of the self-levelling means, and consequently of an auxiliary object carried thereby, with respect to a true horizontal or true perpendicular reference plane so that any slight deviation therefrom can be visually observed prior to, during, and subsequent to controllable manual operation of the hereinbefore-mentioned small-magnitude orientation-correction means and locking means so that a person using the apparatus will first of all know that a small-magnitude angular positional adjustment is needed and will also know when full positional correction has been achieved.

With the above points in mind, it is an object of the present invention to provide novel levelling and supporting apparatus of the character referred to herein generically and/or specifically, which may include any or all of the features referred to herein, either individually or in combination, and which is of relatively simple, inexpensive, easy-to-assemble and dissassemble construction suitable for ready mass manufacture, assembly, and distribution at relatively low cost per item, both as to initial tooling cost and as to the per-unit production cost per item, whereby to be conductive to wide-spread production, distribution, and use of the invention for the purposes outlined herein.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, several exemplary embodiments of the invention are illustrated in the hereinbelow-described figures of the accompanying three drawing sheets and are described in detail hereinafter.

FIG. 1 is a fragmentary, elevational view of one exemplary form of the apparatus of the present invention with the tripod legs of one exemplary type of supporting structure therefor broken away at the bottom ends thereof, and with a near portion of the hollow bell-shaped mass of the self-levelling means broken away to show the hollow interior thereof and the plumb bob in its normal upper nested position therewithin. This view also shows the auxiliary object-mounting plate means at the top of the self-leveling means without any auxiliary object mounted thereon, although it is understood that it is intended to mount such an auxiliary object.

FIG. 2 is a fragmentary top plan view of the apparatus of FIG. 1.

FIG. 3 is an enlarged cross-sectional view of the centrally-positioned, self-levelling means at the location of the two mutually-perpendicular horizontal sight means cooperable with plumb bob means and supporting line means to comprise orientation-indicating means and is taken substantially on the plane indicated by the arrows 3—3 of FIG. 1.

FIG. 4 is a fragmentary, sectional view taken substantially along the plane indicated by the arrows 4—4 of FIG. 3.

FIG. 5 is a view, partly comprising a bottom plan view and partly comprising a cross-sectional view, taken substantially along the plane indicated by the arrows 5—5 of FIG. 1 and illustrates the apparatus as so viewed but with the three tripod legs of the exemplary type of supporting structure removed and with the apertured leg-mounting projections having their end portions broken away also. Said omissions are made for drawing space-saving reasons and in order to simplify and clarify the showing of FIG. 5.

FIG. 6 is an enlarged, fragmentary, cross-sectional view taken substantially along the plane indicated by the arrows 6—6 of FIG. 1.

Figure 7:
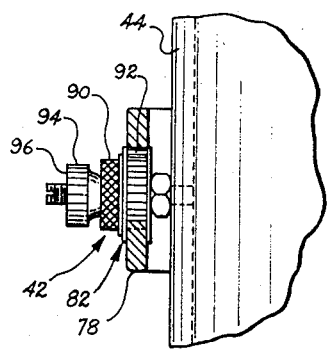

FIG. 7 is an enlarged, fragmentary view, partly in elevation and partly in section, taken substantially along the plane indicated by the arrows 7—7 of FIG. 1 and shows an exemplary one of the two controllable operable small-magnitude orientation-correction means and locking means in effectively operable engaged and activated relationship with respect to the rest of the apparatus and, indeed, in this view it is actually shown in fully-locked relationship such as it would normally assume after a small adjustment had been made and the locking means had then been tightened into locked relationship to hold the small-magnitude adjustment which had just been made.

FIG. 8 is an additionally enlarged fragmentary, cross-sectional view taken substantially along the plane indicated by the arrows 8—8 of FIG. 6 and shows only the inner tube and the central dowel or support pin with the slotted V-shaped slot through which the plumb bob support line passes at the exact center of two mutually perpendicular and horizontally directed axes of rotation of the self-levelling means.

FIG. 9 is a fragmentary view, partly in elevation and partly in section, similar in many respects to FIG. 1 but taken at right angles thereto substantially along the plane indicated by the arrows 9—9 of FIG. 2.

FIG. 10 is a cross-sectional view taken substantially along the plane indicated by the arrows 10—10 of FIG. 9.

FIG. 11 is a view taken substantially along the plane indicated by the arrows 11—11 of FIG. 9.

FIG. 12 is a fragmentary, partially-broken-away view of the apparatus of FIG. 1 as seen in elevation from the left side thereof and also showing in phantom one exemplary type of auxiliary object carried by the auxiliary object-mounting plate means at the top of the self-levelling means and illustrated as comprising a surveyor's transit.

FIG. 13 is an enlarged exploded view of an exemplary one of the two controllably operable small-magnitude orientation-correction means and locking means for providing very small angle adjustment of the self-levelling means into a selected reference orientation such that the vertical axis of the bottom-weighted self-levelling means will be coincident with an absolutely true vertical reference line and such that the top surface of the auxiliary object-mounting plate means at the top of the self-levelling means will correspondingly lie in a desired reference orientation comprising a horizontal reference plane.

FIG. 14 is a view similar to FIG. 7 but illustrates the exemplary one of the two controllably operable small-magnitude orientation-correction means and locking means of FIG. 7 in effectively inoperable or inactivated relationship with respect to the rest of the apparatus so as to allow the depending self-levelling means to operate freely.

Figure 15:
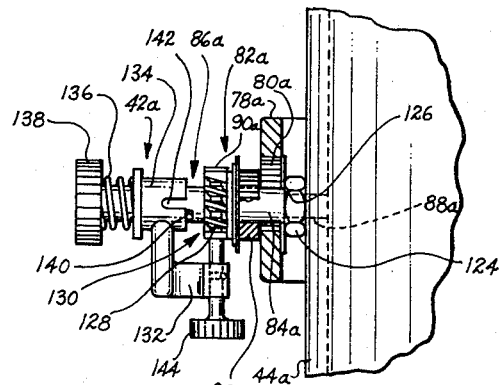

FIG. 15 is a view similar in many respects to FIG. 14 and is partly a sectional view taken on a similar vertical plane of a modified form of the invention and is partly an elevational view of said modified form of the invention and illustrates a modified type of controllably operable small-magnitude orientation-correction means and locking means adapted to be employed in lieu of the two embodiments of the first form thereof of the invention as illustrated in FIGS. 1–14 inclusive and shown in greatest detail with respect to an exemplary one thereof in FIGS. 7, 13 and 14.

Figure 16:
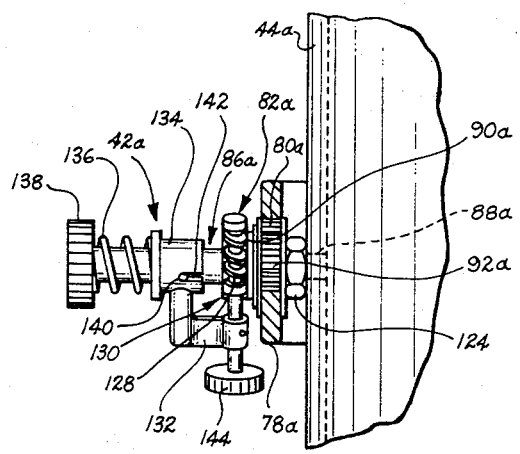

FIG. 16 is a view similar to FIG. 15 but shows the orientation-correction means and locking means in effectively operable engaged, activated, and locked relationship with respect to the rest of the apparatus in a manner functionally similar to the showing of FIG. 7 showing the corresponding apparatus of the first form of the invention.

Figure 17:
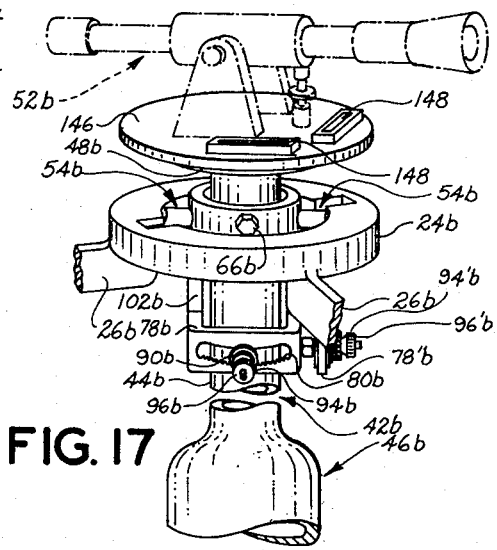

FIG. 17 is a fragmentary view in perspective and with certain portions of the apparatus shown partly broken away and illustrates a slight modification of the invention adapted to mount a modified and extremely inexpensive transit of very much simpler type than a conventional surveyor's transit.

Generally speaking, the levelling and support apparatus of the present invention may be said to include a supporting structure, or supporting structure means, provided at the top with connection means carrying gimbal-type coupling means which in turn carries self-levelling means depending therefrom and provided with a substantial mass means positioned below said gimbal-type coupling means whereby to provide a gravity-operated self-centering and self-levelling action of said depending self-levelling means and a mounting base plate means connected thereto above said gimbal-type coupling means so as to cause both said depending self-levelling means and said mounting base plate means, and any auxiliary object adapted to be mounted on said base plate means, to substantially assume, under the action of gravity, a selected orientation which is identical or very nearly identical to a reference orientation. In this connection, it should be noted that the words "level" and "level orientation" when referring to the top surface of the mounting base plate means, which is normally transversely mounted with respect to the depending self-levelling means, are intended to be synonymous with the word "horizontal." In other words, said level orientation and the corresponding reference orientation, when so applied, mean a horizontal orientation. However, the word "level" and the words "level orientation" when applied to the depending part of the self-levelling apparatus are synonymous with the word "plumb," the word "vertical," or any combination thereof, since the plumb or vertical orientation of the depending part of the self-levelling apparatus occurs whenever the horizontal upper position mounting base plate means is in a true horizontal orientation (which shall be broadly construed to mean whenever an auxiliary object mounted thereby is in such a true horizontal orientation irrespective of the actual positioning of the mounting plate).

In the exemplary first form of the invention illustrated, the supporting structure means referred to broadly hereinabove takes the form of a tripod-type upstanding supporting structure, such as is generally designated by the reference numeral 20, which is shown as having three legs 22 which are shown fragmentarily and which may be of predetermined lengths or of controllably adjustable and lockable lengths and, since such arrangements are well-known in the art and do not touch upon the inventive merits of the present invention, the full showing of either of said types of legs is not illustrated in the drawings, but all such arrangements are intended to be included and comprehended within the scope of the present invention.

The connection means broadly referred to hereinabove as being positioned at the top of the supporting structure 20 and provided with the gimbal-type coupling means, takes the form of a substantially circular disc-shaped connection apex panel or platform means 24 which is pivotally connected by three 120-degree displaced, angularly downwardly directed mounting projection members 26 to the upper ends of the three legs 22 by three corresponding bolt means 28 and wing nut means 30.

It will be noted that the three mounting projections 26 are laterally apertured as indicated in broken lines at 32 in FIG. 2 for alignment with a corresponding pair of laterally-directed apertures 34 positioned on each side of the slot 36 and on each side of the corresponding mounting projection 26 to allow the corresponding mounting bolt 28 to pass through the aligned apertures 32 and 34. Preferably each mounting bolt 28 will have a smooth, non-exteriorly-threaded central shaft portion passing through the aligned apertures 34 and 32 to minimize any rotative friction, and the extended opposite end of the bolt 28 will be threaded, as is indicated with respect to one of same at 38 in FIG. 2, for engagement with the corresponding interiorly threaded wing nut 30.

Thus, the three bolts 28 act as effective pivot pins for the three legs 22 and the three wing nuts 30 act as locking means for locking any of the three legs 22 in any selected position after initial adjustment thereof for the purpose of placing the connection apex panel or platform means 24 in as nearly a horizontal position as can be easily attained by positionally adjusting the legs 22. In the case of legs which are also length-adjustable, this may also come into play in facilitating the positioning of the complete tripod supporting structure 20 on an underlying ground surface (not shown) so as to cause the connection apex panel or platform means 24 to lie in as nearly a horizontal plane as possible. This may be done quite rapidly and will allow the depending self-levelling means referred to broadly hereinbefore and generally designated by the reference numeral 40 to function freely for self-levelling purposes provided that each of the two controllably operable small-magnitude orientation-correction means and locking means, generally designated at 42, is in the effectively inoperable or inactivated relationship clearly shown in FIG. 14. The purpose of this will be described in greater detail hereinafter.

The self-levelling means 40 comprises a longitudinal vertical alignment member 44 which is shown as comprising a longitudinal hollow tubular member provided at the bottom with a centering mass means 46 taking the form of a large, heavy, hollow bell-shaped structure and provided at the top of said longitudinal vertical alignment member 44 with said previously-mentioned auxiliary object mounting plate means 48 which is shown as taking the form of a substantially flat circular plate having an exterior threaded rim 50 which may be called a connection member adapted to co-operate with and connect the mounting plate means 48 with respect to an auxiliary object, such as a conventional surveyor's transit of the type indicated generally in phantom lines at 52 in FIG. 12, for example, or any other desired auxiliary object. Incidentally, it should be noted that means other than the threaded upstanding rim 50 for connection of the mounting plate means 48 to the auxiliary object to be mounted thereby may be employed within the broad scope of the present invention and all such arrangements are intended to be included and comprehended herein.

The gimbal-type coupling means generally referred to hereinbefore takes one exemplary form and is generally designated by the reference numeral 54 and comprises an outer ring 56 provided with axially aligned, outwardly projecting shaft portions 58 mounted by the multi-direction zigzag or offset bayonet-type retaining slot means 60 in the connection apex panel or platform means 24 in a controllably removable manner and yet in a positively retained manner when once mounted in said retaining slot means 60. Furthermore, it should be noted that the mounting of said shaft portions 58 in said retaining slot means 60 is such as to freely allow rotation of said shaft portions 58 in said retaining slot means 60 around what might be called a first horizontally directed axis of rotation such as is shown fragmentarily in broken lines at 62 in FIG. 2. Said outer ring 56 lies within a center opening or cut-out portion 64 defined within the center region of the connection apex panel or platform means 24.

Said gimbal-type coupling means 54 also includes a cross-shaft member or portion 66 extending across the inner opening 68 of said outer ring 56 from one side to the other side thereof in a horizontal direction and perpendicular to the direction of said previously mentioned axially aligned, outwardly projecting shaft portions 58 and passing through the aligned apertures 70 in said outer ring 56 and also passing through aligned apertures 72 in the previously mentioned tubular vertical alignment member 44 at a location very near the upper end thereof and only a short distance below the auxiliary object mounting plate means 48 in a manner such as to rotatably mount said tubular vertical alignment member 44 of the complete self-levelling means 40 for rotation relative to said outer ring 56 around a second axis of rotation such as is fragmentarily indicated in broken lines at 74 in FIGS. 2 and 11 and which is horizontally directed and perpendicular to the previously mentioned first axis of rotation 62.

Thus, it will be seen that the complete gimbal-type coupling means 54 mounts the tubular vertical alignment member 44 of the complete self-levelling means 40 in a manner such as to freely allow rotation thereof around the two mutually perpendicular, horizontally directed axes of rotation 62 and 74, which cross each other at the reference center point indicated at 76 in FIGS. 2 and 11 and which effectively lies on the vertical central axis of the self-levelling means 40 so that gravity acting upon the mass means 46 at the bottom of the self-levelling means 40, in the absence of any constraint, will normally cause the complete self-levelling means 40 to rotate around said two mutually perpendicular and horizontally directed axes of rotation 62 and 74 and said reference center point 76 so that the vertical central axis of the self-levelling means 40 lies on a true vertical or plumb line passing directly vertically through said reference center point 76 and correspondingly passing directly through the center of the auxiliary object mounting base plate means 48 which, because it is mounted at right angles to the longitudinal axis of the self-levelling means 40, will lie in a true horizontal plane or very nearly so.

It may be found that very small-magnitude constraints, such as friction, off-center weights of the auxiliary object to be supported, or other unsymmetrical effects, may cause the self-levelling action of the self-levelling means 40 to cease before the vertical axis thereof lies exactly and identically on a vertical plumb line, thus requiring a very small-magnitude additional orientation correction if the true reference orientation (vertical with respect to the vertical axis of the self-levelling means 40 and horizontal with respect to the mounting base plate means 48) is to be attained and either or both of the two perpendicularly related previously generically mentioned controllably operable, small-magnitude orientation-correction means and locking means 42 may be controllably moved from the effectively inoperable and inactivated relationship in which they have been positioned, as shown with respect to one of same in FIG. 14, into a fully operable and fully activated relationship such as is shown in FIG. 7 with respect to one of same, and controllable operation of either or both of same may be effected until the true reference orientation of the self-levelling means 40 and the mounting base plate means 48 carried thereby are attained, at which time the locking means of said two structures designated at 42 may be locked to positively immobilize the self-levelling means 40, the mounting base plate means 48 and an auxiliary object, such as shown at 52 in FIG. 12, in the precise exact desired orientation.

Each of the controllably operable small-magnitude orientation-correction means and locking means, generally designated at 42, may be said to be effectively connected in a by-passing or shunt manner with respect to relatively rotatably movable portions of the gimbal-type coupling means 54 for locking same in any of a plurality of selected relative rotatably related positions—usually positions corresponding to the attainment by the self-levelling means 40 of the desired reference orientation where the vertical axis thereof lies on a true plumb line and an auxiliary object 52 carried by the mounting base plate 48 lies in a true horizontal reference position as is clearly shown in FIG. 12.

Each of said orientation-correction means and locking means 42 comprises a plate 78 and 78', respectively, having an arcuate slot having a ring gear 80 and 80', respectively, formed along at least one laterally directed edge thereof and with said ring gear 80 or 80' and the plate 78 or 78' in which it is formed, being curved in an arcuate manner having as a center the corresponding horizontal axes of rotation 74 and 62, respectively, and being relatively movable in the case of the ring gear 80 with respect to the portion of the gimbal-type mounting means (comprising the tubular vertical alignment member 44 carried by the bolt or pivot pin 66) and, in the case of the ring gear 80', being relatively movable with respect to the movable portion of the gimbal 54 (comprising the outer ring 56). The ring gear 80 is provided with a manually operable driving gear means generally indicated at 82 which can be positioned in engagement therewith in effective operative and activating relationship as is most clearly shown in FIG. 7, and can be moved into effective inoperable and inactivated position with respect thereto, as is best shown in FIG. 14.

The driving gear 82 is mounted on a smooth shaft portion 84 of a horizontally directed mounting member which is generally indicated by the reference numeral 86 and which has its inner end 88 fixedly attached to the tubular vertical alignment member 44 so as to move therewith when it rotates around the axis of rotation 74. Of course, this will cause the mounting member 86 to arcuately move relative to the ring gear 80 and this is precisely the purpose of the driving gear means 82, which is rotatably mounted on the smooth exterior portion 84 of said mounting member 86 and which has an outer knurled portion 90 adapted to be manually rotated when the inner spur gear portion 92 has been moved into engaged relationship with the ring gear teeth 80 as shown in FIG. 7, thus positively driving the mounting member 86 and the tubular vertical alignment member 44 attached to the inner end thereof, in a rotative manner around the axis of rotation 74 until true vertical alignment of the self-levelling means 40 around said axis of rotation 74 has been attained.

At that time, the knurled exterior 94 of the locking knob 96 may be manually grasped and rotated so as to threadedly advance the interiorly threaded bore 98 thereof along the exteriorly threaded end 100 of said horizontal mounting member 86 so as to tighten the inner end of the locking knob 96 against the outer face of the driving gear means 82 in a manner positively locking and immobilizing the complete assembly comprising that particular one of the two orientation correction means and locking means 42.

The plate 78 has upwardly extending hanger portions 102 which are attached with respect to the outer ring 56 and the shaft portions 58.

The other orientation-correction means and locking means 42 has an exactly similar horizontal mounting means 86' which has precisely the same structure as the one illustrated in detail in FIG. 13 and described in detail hereinbefore and which furthermore has a driving gear 82' of a construction precisely the same as that shown at 82 in FIG. 13 described in detail hereinbefore and which furthermore carries a locking knob 96' precisely the same as the one shown at 96 in FIG. 13 and described in detail hereinbefore. Since the structure of said second orientation-correction means and locking means 42 is exactly the same as the first one illustrated in FIG. 13 and described in detail hereinbefore, it will not be specifically described in detail since this would be redundant and a mere repetition. However, in the case of said second orientation-correction means and locking means 42, it should be noted that the inner end of the horizontal mounting member 86′ is attached to a lower side portion of the plate 78 at a position below the upstanding hangers 102 thereof. The plate 78′ has its upper end fixedly attached to the connection apex panel or platform means 24.

From the above description of the two orientation-correction means and locking means 42, it will be understood that one of them (the second-described one) effectively connects the connection apex panel or platform means 24 therethrough in a controllably rotatably adjustable and lockable manner relative to the axis 62 and with respect to the side portion of the mounting plate 78 of the other of said orientation-correction means and locking means 42 (the first-described one thereof) which in turn connects said plate 78 therethrough in a controllably rotatably adjustable and lockable manner relative to the axis 74 and with respect to the tubular vertical alignment member 44.

It will be understood that the above-described similar structures of the two orientation-correction means and locking means 42 makes it possible by rotation of the knurled portions 90 and/or 90′ of the driving gears 82 or 82′, respectively, thereof to correct the relative position of the depending self-levelling means 40 around the two mutually perpendicular axes 74 and 62, respectively, until a true vertical plumb orientation is attained, at which time the locking knob 96 or 96′, respectively, may be locked to maintain said true vertical plumb orientation of the self-levelling means 40.

It should be noted that when the orientation-correction means and locking means 42 are moved into inoperative, ineffective relationship such as that shown with respect to one of same in FIG. 14, the self-levelling means 40 is free to operate under the influence of gravity, and this is the position of the apparatus when the supporting structure means 20 is initially set up at a new location.

As soon as the self-levelling means 40 has reached a condition of stability after such a new set-up of the supporting structure means 20 is made, the two orientation-correction means and locking means 42 are moved into operative activated engaged relationship such as is shown in FIG. 7 with respect to one of same. If the initial self-levelling operation of the self-levelling means 40 has been adequate and has achieved a true reference orientation, which can be quickly determined by visually observing orientation-indicating means, one form of which is generally designated by the reference numeral 104, then the two locking knobs 96 and 96′ may be locked and the auxiliary object 52 is ready for use.

However, if the orientation-indicating means 104 shows that a very slight deviation from the true reference orientation still exists (usually because of minor constraints, unsymmetrical or off-center weight distribution of the auxiliary object 52, or for any reason whatsoever), then appropriate corrective action in the right direction or in either or both of the two mutually perpendicular directions relative to the axes of rotation 62 and/or 74 may be achieved by rotating the appropriate knurled driving gear portions 90′ and 90, respectively, until the true vertical plumb reference orientation of the self-levelling means 40 has been attained (which corresponds to the attainment of a true horizontal reference orientation of the auxiliary object 52). Then the locking knobs 96′ and 96 may be locked and the auxiliary object 52 is ready for use.

In the exemplary first form of the invention illustrated, the above-mentioned orientation-indicating means generally indicated at 104 comprises plumb bob means 105 carried by a supporting line means 107 mounted in a manner which will be described hereinafter so as to concentrically depend along the central vertical axis of the tubular vertical alignment means 44 of the self-leveling means 40, and, in the process of doing so, passing through sight means comprising the pair of aligned apertures 106 for indicating departure from true vertical alignment around the axis of revolution 74, and further comprising the single aperture 108 for indicating departure from true vertical alignment with respect to the other axis of rotation 62. A pin or screw member 110 is positioned in direct opposition to the aperture 108 and has a sighting post or tip 112 at its inner end which lies in the same vertical plane as the axis of revolution 62 when true vertical alignment of the self-levelling means 40 has been achieved and which lies very slighly to the left of the mutually perpendicular plane bisecting the other two apertures 106 and coincident with the other axis of revolution 74 when the self-levelling means 40 has achieved true vertical reference positioning.

In actual use, one merely steps up to one of the pair of aligned apertures 106 and sights or looks diretly therethrough at the plumb bob supporting line 107 and the sighting post 112. If they virtually touch each other in just about the relationship most clearly shown in FIGS. 3 and 4, true vertical positioning of the self-levelling means 40 around the axis 74 has been achieved. If not, the extent of deviation therefrom can be determined by improper relative positioning of the plumb bob support line 107 with respect to said sighting post 112. This determines the positioning around the axis of revolution 74. To determine the position of the self-levelling means 40 around the axis of revolution 62, one merely places his eye in horizontal alignment with the viewing aperture 108 and looks directly at both the plumb bob supporting line 107 and the portion of the sighting post or tip 112 lying immediately therebehind. If they are in alignment so that said sighting post tip 112 is directly behind the plumb bob support line 107, then true vertical positioning of the self-levelling means 40 around the axis of rotation 62 has been attained. Any deviation in said two observed portions will be a measure of the improper positioning of the self-levelling means 40 and of the extent of corrective action required by using the proper orientation-correction means and locking means 42 in the manner described in detail hereinbefore.

The plumb bob support line 107 is maintained on the vertical center line of the tubular vertical alignment member 44 and coincident with the reference center point 76 by the provision at the center of the previously described mounting pin or bolt 66 of an arcuately upper and lower cut-away knife-edge portion 114 which has a V-shaped slot 116 terminating in and having an apex lying exactly coincident with said previously mentioned reference center point 76 so that the plumb bob support line 107 passing therethrough will lie exactly on and will be centered on said reference central point 76. Above said notch 116 the upper portion of the plumb bob support line passes upwardly and outwardly through a hole 118 in the tubular vertical alignment member 44 and then downwardly along the side thereof to an attachment means 120 which may be of any suitable type. This makes it possible to pull the upper end of the plumb bob support line 107 until the tapered upper portion 122 of the plumb bob 105 snugly fits into the corresponding inner tapered neck portion 124 of the hollow bell-shaped mass 46 so that the plumb bob 105 is both physically protected and is also effectively positionally immobilized relative to the hollow bell-shaped mass 46. Of course, the free end of the plumb bob support line 107, in said fully retracted relationship, will then be tied or fastened to the fastening means 120. Such an arrangement is clearly illustrated in both FIGS. 1 and 9.

It will be understood that the plumb bob support line 107 may be disengaged from the fastening means 120 to allow the plumb bob means 105 to be lowered to ground level for use in a manner in accordance with conventional surveying practice, and such will not be described.

FIGS. 15 and 16 illustrate a slight modification of the two orientation-correction means and locking means 42 of the first form of the invention and the showing of one of said modified structures, as illustrated in FIGS. 15 and 16, is to be considered as representative of both of same. Parts which are functionally or structurally similar to those of the first form of the invention are designated by similar reference numerals, followed by the letter "a," however. It will be noted that the modified orientation-correction means and locking means 42a as shown in FIG. 15 is illustrated in inoperable, inactivated or disengaged relationship similar to that of the first form of the invention as illustrated in FIG. 14 and it includes a horizontal longitudinal support member 86a which has a smooth cylindrical exterior surface 84a and which has a threaded inner end 88a for attachment to the vertical alignment member 44a, usually with a lock nut and/or washer 124 positioned between a shoulder 126 and the outer surface around a tapped aperture in the alignment member 44a. A driving gear means 82a is freely rotatably and slidably mounted on the smooth exterior portion 84a of the mounting member 86a and has the spur gear portion 92a, which is adapted to move into driving engagement with the ring gear teeth 80a when moved toward the right from the disengaged relationship shown in FIG. 15 into the engaged relationship shown in FIG. 16. However, in this modification the portion of the driving gear means 82a positioned at the outer end thereof and corresponding to the exteriorly knurled portion 90 of the first form of the invention, as perhaps best shown in FIG. 13, now comprises a worm wheel 90a which is in driven engagement with the toothed portion 128 of a worm member 130, which is longitudinally fixedly but freely rotatably mounted in a bracket member 132 which has an apertured sleeve portion 134 thereof positioned on the mounting member 86a and against one end of a biasing spring 136 which has its opposite end pressing against the inside of a head 138 carried by said horizontal mounting member 86a.

It should be noted that a pin 140 extends through a portion of the shaft of the mounting member 86a and is adapted, when in the right rotative relationship with respect to the apertured mounting bracket sleeve portion 134 to longitudinally slip into corresponding receiving and locking notch or recess means 142, placing the apparatus in an engaged relationship as shown in FIG. 16. This of course effectively keys the supporting bracket 132 and the worm member 130 to the horizontal mounting member 86a in a manner such as to prevent relative rotation therebetween, and this also allows the biasing spring 136 to force the apertured mounting bracket sleeve portion 134 toward the right and to correspondingly force the entire driving gear means 82a toward the right until the spur gear 92a is in driving engagement with the ring gear teeth 80a as is shown in FIG. 16.

Thus, it will be understood that rotation of the knurled worm knob 144 will cause the worm wheel 90a to rotate and will correspondingly rotate the spur gear 92a and move the entire assembly carried by the mounting member 86a arcuately along the ring gear 80a until manual rotation of the knob 144 is stopped, which will have the effect of locking the entire assembly since reverse driving power transmission from a worm wheel to a worm is not possible in the structure illustrated.

However, when the entire device is to be moved into inoperable or ineffective relationship, such as is shown in FIG. 15, to allow the self-levelling means, such as that shown at 40 in the first form of the invention, to function after an initial set-up, all that it is necessary to do is to manually grasp the movable assembly shown in FIG. 16 and to pull same outwardly against the action of the biasing spring 136 until the spur gear 92a has become disengaged from the ring gear 80a and then the entire worm mounting bracket member 132 may be slightly rotated around the axis of the mounting member 86a so as to rotatively misalign the keying pin 140 and the corresponding receiving recess means 142. This will cause the apparatus to be held in the inoperable, ineffective, and disengaged relationship shown in FIG. 15 until such time as the worm assembly is again rotated around the axis of the mounting member 86a into a position such that the keying pin 140 is again aligned with the receiving recess 142, at which time release of the worm assembly will allow the biasing spring 136 to move it toward the right into the engaged relationship shown in FIG. 16.

FIG. 17 is a view similar in some respects to the showing of FIG. 12, and similar reference numerals followed by the letter "b," however, designate parts which are structurally or functionally similar thereto. In this case, a modified auxiliary object 52b is adapted to be mounted on the mounting plate means 48b and takes the form of a relatively inexpensive telescope which may be provided with suitable sighting means such as reticle means, crosshair means, sighting post means, or the like, and may have a base portion 146 provided with underlying attachment means adapted to fasten onto the mounting base plate 48b, with said base portion 146 being provided with a pair of mutually perpendicular and horizontally positioned bubble-type level indicators, such as designated by the reference numeral 148, which can be employed as an alternate form of orientation-indicating means to be used in lieu of the orientation-indicating means 104 of the first form of the invention. Therefore, since this modified form of the invention does not necessarily require a plumb bob or a plumb bob support line to provide such an orientation-indicating means, they may be dispensed with, if they are otherwise not needed, in this modified form of the invention. Otherwise, this modified form of the invention is substantially similar to the earlier forms of the invention illustrated and described in detail hereinabove, and no additional description thereof is thought necessary or desirable.

It should be noted that in the various forms of the invention, if the auxiliary object (such as that shown at 52 in FIG. 12 or at 52b in FIG. 17) should be either quite heavy or have a very substantially elevated center of gravity or a center of gravity which is slightly offset from the vertical center line of the self-levelling means 40 so that there might be an unsymmetrical top-heavy or off-center deflection effect produced thereby on the self-levelling means 40, this may be minimized to any desired extent by merely increasing the weight of the centering mass means 46 and means may be provided for adjustably increasing same, such as by screwing into or otherwise fastening to the bell-shaped mass means 46 auxiliary weight means of any desired weight. Alternatively, if desired, a self-levelling means 40 may be manually aided in assuming a true vertical orientation in order to effectively counteract such an unsymmetrical, top-heavy or deviation-producing effect, and, of course, once the orientation-correcting and locking means 42 are locked, such an off-center or unsymmetrical weight distribution or top-heavy effect produced by such an auxiliary object is no longer of any significance.

It should be noted that the apparatus of the present invention may be manufactured relatively cheaply and, desirably, each of the individual portions which relatively moves with respect to another portion may be made of integral construction such as cast construction, stamped construction, or other integrally formed construction, thus greatly reducing the cost of production of the apparatus of the invention.

Incidentally, it should be noted that the invention is not limited to the specific gimbal-type coupling means illustrated and described, but may employ any universal-type connection or coupling means substantially functionally equivalent thereto and said coupling means is to be broadly construed as including all such arrangements.

It should be noted that the connection apex panel or platform means 24 is centrally provided with the previously mentioned enlarged opening or hole indicated at 64 which is of a size sufficiently large to allow the vertical removal of virtually the entire self-levelling means 40 and gimbal-type coupling means 54 therethrough. In some cases, this may be facilitated by disassembling or disengaging the orientation correction and locking means 42 or at least the horizontal mounting portions 86 thereof. This applies to all of the forms of the invention illustrated and described in this application.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

1. Levelling and supporting apparatus, comprising: an auxiliary object mounting means having a connection member adapted to cooperate with a corresponding connection member of an auxiliary object which is to be effectively mounted thereby; an upstanding supporting structure adapted to rest upon an underlying supporting surface and provided at the top thereof with a connection apex panel and platform means; universal-type coupling means effectively rotatively interconnecting said auxiliary object mounting means with respect to said connection apex panel and platform means for rotation around two mutually perpendicular, substantially horizontal axes of rotation at a location adjacent to and below the connection location in which an auxiliary object is adapted to be positioned when mounted on said object mounting means; and self-levelling means depending from said object mounting means and comprising a longitudinal vertical alignment member provided with and carrying centering mass means at at position below the rotative coupling interconnection of said coupling means effectively between said object mounting means and said apex connection panel and platform means whereby to provide a gravity-operated, self-centering and self-levelling action of said mass and of said object mounting means connected thereabove so as to cause a central axis thereof to be substantially vertically oriented under the action of gravity within a short time after said supporting structure has been moved into a particular supported orientation on an underlying supporting surface; said universal-type coupling means comprising an outer ring provided with axially aligned, outwardly projecting shaft portions coincident with one of said two mutually perpendicular axes of rotation and provided with a perpendicularly directed cross-shaft means extending across said outer ring and rotatively receiving and mounting on said cross-shaft means and within said outer ring for rotation on said second axis of rotation which is coincident with said cross-shaft means an upper portion of said vertical alignment member of said self-levelling means.

2. Apparatus as defined in claim 1, including controllably operable, small-magnitude, orientation-correction and locking means effectively connected in a by-passing shunt manner with respect to relatively rotatably movable portions of said coupling means for locking same in any of a plurality of selected relative rotatably related positions corresponding to a corrected vertical positioning of said vertical alignment member.

3. Apparatus as defined in claim 2, wherein each of said orientation-correction and locking means comprises an arcuate partial ring gear having as a center a corresponding one of said two mutually perpendicular, horizontally directed axes of rotation and movably mounted relative thereto, and further comprises a manually operable driving gear means engageable therewith and physically carried by and movable with a portion of said coupling means which is pivotally mounted around the corresponding one of said two mutually perpendicular horizontal axes of rotation.

4. Apparatus as defined in claim 3, including means mounted said driving gear means for manually initiated and controlled engagement and disengagement with respect to said arcuate ring gear to allow disengagement thereof to exist until said self-centering and self-leveling action has occurred, after which engagement thereof may be effected for the purpose of allowing minor vertical alignment corrective movement as determined by manual operation of said driving gear means.

5. Apparatus as defined in claim 3, wherein said driving gear means includes means for fixedly immobilizing same in any selected relative position with respect to said arcuate ring gear.

6. Apparatus as defined in claim 4, wherein said driving gear means includes means for fixedly immobilizing same in any selected relative position with respect to said arcuate ring gear.

7. Apparatus as defined in claim 3, wherein said manually operable driving gear means comprises coupled worm, worm wheel, and spur gear means and mounting means therefor for properly longitudinally axially positioning said worm for driving cooperation with said worm wheel and corresponding effective driving cooperation with respect to said spur gear driven by said worm wheel.

8. Apparatus as defined in claim 7, including means mounting said driving gear means for manually initiated and controlled engagement and disengagement with respect to said arcuate ring gear to allow disengagement thereof to exist until said self-centering and self-levelling action has occurred, after which engagement thereof may be effected for the purpose of allowing minor vertical alignment corrective movement as determined by manual operation of said driving gear means.

9. Apparatus as defined in claim 8, wherein said driving gear means, by reason of its worm and worm wheel included elements, cooperates in a manner for fixedly immobilizing same in any selected relative position with respect to said arcuate ring gear.

10. Apparatus as defined in claim 1, including orientation-indicating means cooperable with said self-levelling means for indicating the orientation thereof with respect to said two mutually perpendicular, horizontally directed axes of rotation.

11. Levelling and supporting apparatus, comprising: an auxiliary object mounting means having a connection member adapted to cooperate with a corresponding connection member of an auxiliary object which is to be effectively mounted thereby; an upstanding supporting structure adapted to rest upon an underlying supporting surface and provided at the top thereof with a connection apex panel and platform means; universal-type coupling means effectively rotatively interconnecting said auxiliary object mounting means with respect to said connection apex panel and platform means for rotation around two mutually perpendicular, substantially horizonal axes of rotation at a location adjacent to and below the connection location in which an auxiliary object is adapted to be positioned when mounted on said object mounting means; self-levelling means depending from said object mounting means and comprising a longitudinal vertical alignment member provided with and carrying centering mass means at a position below the rotative coupling interconnection of said coupling means effectively between said object mounting means and said apex connection panel and platform means whereby to provide a gravity-operated, self-centering and self-levelling action of said mass and of said object mounting means connected thereabove so as to cause a central axis thereof to be substantially vertically oriented under the action of gravity within a short time after said supporting structure has been moved into a particular supported orientation on an underlying supporting surface; and orientation indicating means cooperable with said self-levelling means for indicating the orientation thereof with respect to said two mutually perpendicular, horizontally directed axes of rotation, said orientation indicating means comprising plumb bob means and supporting line means concentrically depending along at least a portion of the length of said vertical alignment member of said self-levelling means and provided with two mutually perpendicular horizontal sight means for viewing a portion of said supporting line means with respect to said relatively movable sight means whereby to provide a visible indication of said orientation of said self-levelling means around said two mutually perpendicular axes of rotation.

12. Apparatus as defined in claim 11, wherein said lower-positioned mass carried by said vertical alignment member of said self-levelling means comprises an enlarged hollow substantially bell-shaped member adapted to snugly receive therein said plumb bob when in its position of maximum elevation and to effectively physically protect same and laterally immobilize same relative to said bell-shaped member.

13. Apparatus as defined in claim 11, wherein said universal-type coupling means comprises an outer ring provided with axially aligned, outwardly projection shaft portions coincident with one of said two mutually perpendicular axes of rotation and provided with a perpendicularly directed cross-shaft portion extending across said outer ring and rotatively receiving and mounting on said cross-shaft and within said outer ring for rotation on said second axis of rotation which is coincident with said cross-shaft means an upper portion of said vertical alignment member of said self-levelling means.

References Cited
UNITED STATES PATENTS

| | | | |
|---|---|---|---|
| 791,364 | 5/1905 | Pfeiffer et al. | 248—184 |
| 1,603,307 | 10/1926 | Anderson | 248—185 XR |
| 2,161,718 | 6/1939 | Miller | 248—182 |

ROY D. FRAZIER, *Primary Examiner.*

J. FRANKLIN FOSS, *Assistant Examiner.*